United States Patent [19]
Wilkinson

[11] Patent Number: 5,659,365
[45] Date of Patent: Aug. 19, 1997

[54] VIDEO COMPRESSION

[75] Inventor: James Hedley Wilkinson, Tadley, England

[73] Assignees: Sony Corporation, Tokyo, Japan; Sony United Kingdom Limited, Weybridge, England

[21] Appl. No.: 658,588

[22] Filed: Jun. 5, 1996

[30] Foreign Application Priority Data

Jun. 6, 1995 [GB] United Kingdom ............. 9511459

[51] Int. Cl.$^6$ ........................................ H04N 11/02
[52] U.S. Cl. .............................. 348/416; 348/396
[58] Field of Search ......................... 348/391, 392, 348/393, 394, 395, 396, 416, 699, 413; 382/107, 206

[56] References Cited

U.S. PATENT DOCUMENTS

| | | |
|---|---|---|
| 4,716,453 | 12/1987 | Pawelski ............................ 358/13 |
| 4,882,613 | 11/1989 | Masumoto ........................ 358/37 |
| 5,376,968 | 12/1994 | Wu et al. .......................... 348/413 |
| 5,387,937 | 2/1995 | Dorricott et al. ................. 348/395 |
| 5,412,428 | 5/1995 | Tahara .............................. 348/396 |
| 5,459,523 | 10/1995 | Tanaka ............................. 348/488 |
| 5,491,523 | 2/1996 | Sato ................................ 348/699 |
| 5,523,786 | 6/1996 | Parulski .......................... 348/269 |
| 5,544,263 | 8/1996 | Iwamura .......................... 382/107 |

*Primary Examiner*—Tommy P. Chin
*Assistant Examiner*—Luanne P. Din
*Attorney, Agent, or Firm*—William S. Frommer; Alvin Sinderbrand

[57] ABSTRACT

In video motion vector generation and compensation, it is common for the chrominance sampling rate to be half the luminance sampling rate. When only a luminance motion vector is used, there can be rounding problems if either the horizontal or vertical motion vector (or both) is odd valued and the luminance motion vector is divided by two to generate a chrominance motion vector. For this reason, the luminance motion vector is provided with an additional bit for either or both axes if odd valued, and a rounding decision, if necessary, is made on the basis of the digital value of the additional bit.

6 Claims, 2 Drawing Sheets

KEY: ■ LUMINANCE SAMPLES
○ CHROMINANCE SAMPLES
(Cb AND Cr)

$V_V$ ODD VALUED $V_H$ ODD VALUED $V_H$ AND $V_V$ ODD VALUED

INTEGER BASED MOTION VECTOR VALUES

VIDEO COMPRESSION

BACKGROUND OF THE INVENTION

1. Field of the Invention

This invention relates to video compression methods and apparatus, in particular in the context of motion vector compensation techniques.

2. Description of the Prior Art

One digital compression standard, known as MPEG, was devised by and named after the Motion Picture Experts Group of the International Standards Organisation (ISO). In one form, known as MPEG1, early versions of the draft standard made use of forward prediction between past and current frames of a video signal. In later forms of MPEG1 and another MPEG2, the standard additionally makes use of bidirectional prediction, namely a combination of forward and backward prediction with the prediction made as an average of the forward and backward predictive frames.

Further details of the various versions of the MPEG standard are described in ISO/IEC 11172-2:1993 (E) "Information Technology—Coding of Moving Pictures and Associated Audio for Digital Storage Media at up to about 1.5 Mbit/s".

The use of motion compensation is an important aspect of MPEG coding. Motion compensation aims to minimise the error signal in difference frames by compensating for interframe movement. The process of motion compensation involves two separate processes:

i) Motion Vector Estimation (MVE); in which the motion offset between a frame pair is calculated; and ii) Motion Vector Compensation (MVC); which uses the results of the MVE calculations to produce a difference signal with minimum artifacts.

There are several aspect of MVE and MVC which must be considered such as:

i) The type of motion permitted. In MPEG and other similar systems, the type of motion is limited simply to translational vectors in the 'X' and 'Y' axes. Researchers working in other fields have used other motion types, such as rotation, skew and size. The benefits of this work are not clear since using more complex shape matching may reduce the signal in the difference picture, but requires more data to transmit the shape parameters.

ii) The size of the macroblock is a compromise between smaller blocks having better coding efficiency but higher macroblock data rate, and larger blocks having worse coding efficiency but lower macroblock data rate (where a macroblock is the block size used for motion estimation and compensation).

iii) How to combine the results from Luminance (Y) and Chrominance (C) block matching. If completely separate vectors are used for Y and C motion vectors, the macroblock data rate will be doubled and there may be the possibility of picture disturbances created by poor matching of Y and C vectors. Combining the Y and C vectors will result in a lower macroblock data rate but the coding efficiency may drop slightly.

iv) The use of sub-pixel estimation and compensation. Often, motion between frames does not appear at integer pixel distances so some form of sub-pixel MVE and MVC will be beneficial. More vector data is generated to be transmitted/recorded and the data increase is very small but simple half-pixel estimation requires at least four times the computational power of a pixel based estimator and this must be considered.

There is a need for further developments in motion compensation coding with emphasis on low bit-rate systems in the range 64 Kbps to 2 Mbps.

Many motion compensated prediction systems use only luminance information for motion vector generation and compensation. However, there are instances of pictures in which much of the motion detail is present in the chrominance data. In such instances, separate motion vectors may be calculated for luminance and chrominance signals. If the luminance and chrominance pixel rates were identical, then a single motion vector could be calculated for both luminance and chrominance signals. However, the chrominance pixel rate is half the luminance rate in both horizontal and vertical axes.

SUMMARY OF THE INVENTION

It is an object of the invention to provide a video compression method involving motion vector processing, in which a chrominance motion vector can be derived from the luminance motion vector without significant degradation of the chrominance motion effect.

According to the present invention there is provided a video compression method involving motion vector processing, wherein the chrominance sampling rate is half the luminance sampling rate, the method comprising estimating a luminance motion vector representing luminance motion in a video picture, making a rounding decision, if necessary, as to the best corresponding chrominance motion fit, and including an additional bit in the luminance motion vector, the digital value of the additional bit representing the rounding decision, wherein the luminance motion vector with additional bit conveys information as to both luminance and chrominance motion.

A chrominance motion vector is then derived by division of the luminance vector by two, and if a rounding decision is necessary following the division, that decision is made in response to the digital value of the additional bit of the luminance motion vector.

The preferred embodiment is capable of generating and applying motion vectors with the addition of one extra bit in each axis, if necessary, to ensure accurate luminance and chrominance motion vectors. Experimental results show a particular improvement for chrominance data.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
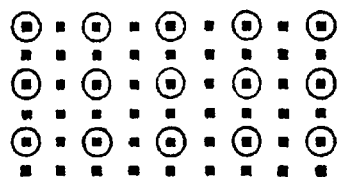
FIG. 1 shows a sample grid of luminance and chrominance components.

Three sizes of picture have been used with motion compensation;

i) 'VID' files: 720*576 pixels (and 704*576), with a target bit rate of around 4 Mbps.

ii) 'SIF' files: 352*288 pixels with a target bit rate of around 1 Mbps (video only) and iii) 'QIF' files: 176*144 pixels with a target bit rate of around 220 Kbps (video only).

In each case, the chrominance pixel size is half in each axis for each component.

Experiments have been conducted to find the optimum macroblock size for each of the above systems. In each case the position was clear in that a macroblock size of 16*16 pixels for luminance and 8*8 for each chrominance produced the best results. In all three cases above, smaller macroblocks such as 8*8 for Y and 4*4 for C resulted in too much vector data, and larger macroblocks such as 24*24 for Y and 12*12 for C resulted in low levels of macroblock data but high error signals in the difference pictures. In this respect MPEG has correctly set the optimum motion vector block size.

The vector data to be transmitted depends on the picture size, but the following calculations were used as a guide to the data rate required for vector transmission:

Case 1: 'VID' files, 720*576 pixels

Number of macroblocks =45*36=1620 per frame

Assuming the logarithmic temporal decimation structure and for Y data a vector range limit of +/−31 pixels/frame, for an 8-Frame GOP (group of pictures):

| No of Frames | Vector Range | Bits | +&− | H&V | Y&C | Total Bits |
|---|---|---|---|---|---|---|
| 4 | +/−31 | 6 | *2 | *2 | *2 | 192 |
| 2 | +/−63 | 7 | *2 | *2 | *2 | 112 |
| 1 | +/−127 | 8 | *2 | *2 | *2 | 64 |

TOTAL BITS/GOP-MACROBLOCK: 368

The total vector bit rate is then
368*25/8*1620=1.863 Mbps.

Assuming that entropy coding can lower this by about 50%, then the overall vector bit rate can be reduced to around 900 Kbps. As mentioned in the introduction, if the Y and C vectors are combined, then this data rate can be further reduced to around 500 Kbps. More about the method of combination will follow in the next section.

Case 2: 'SIF' files, 352*288 pixels

Number of macroblocks =22*18=396 per frame

Similar calculations to VID picture coding follow, bearing in mind that the vector range limit can be reduced to +/−15 pixels/frame:

| No of Frames | Vector Range | Bits | +&− | H&V | Y&C | Total Bits |
|---|---|---|---|---|---|---|
| 4 | +/−15 | 5 | *2 | *2 | *2 | 160 |
| 2 | +/−31 | 6 | *2 | *2 | *2 | 96 |
| 1 | +/−63 | 7 | *2 | *2 | *2 | 56 |

TOTAL BITS/GOP-MACROBLOCK: 312

The total vector bit rate is then
312*25/8*396=386.1 Kbps

With entropy coding and Y/C vector combination, this can be reduced to around 100 Kbps.

Case 3: 'SIF' files, 176*144 pixels

Number of macroblocks =11*9=99 per frame

For 'QIF' coding, and using a vector range limit as for SIF pictures because motion errors are much more critical with such a low resolution source, then the total vector bit rate becomes;

312*25/8*99=96.5 Kbps which, with entropy reduction and Y/C vector combination, reduces to around 25 Kbps.

In each case above, the vector data rate is around 10% of the total required bit rate which is a reasonable allowance and not a level at which the motion vectors would severely limit the primary coding method. The use of macroblocks at a quarter of the size used above would increase the vector data rate to around 40% of the total data rate and become a severe overhead to the coding efficiency. The benefit gained by the use of quarter sized macroblocks is less than the quality loss resulting in the main coding area. Likewise, use of larger macroblocks reduces the vector data rate but only gains a small benefit for other coding areas. Such large macroblocks result in larger difference picture errors which cannot be so easily compensated in the remaining coding elements.

The use of sub-pixel vectors will require a small amount of extra data equivalent to an extra 14 bits per macroblock-GOP.

It has been mentioned that sending separate vectors for Y and C is wasteful of data bandwidth and could lead to misalignment of luminance and colour information. It is a commonly observed fact that the motion vectors of the chrominance components almost always follow the luminance component. There are exceptions, but these are very rare. Furthermore, the B-Y and R-Y components tend to have the same motion vectors. Therefore, a set of three vectors can easily be reduced to one by this simple assumption.

The problem with this assumption is a result of the nature of the chroma subsampling. Each chrominance component has half the sampling rate of the luminance component, leading to the sampling grid shown in FIG. 1.

Then, if a vector value has an odd luminance pixel value, there is a rounding problem in the chrominance vector value since the vector does not point directly to a chrominance pixel site. At first it may seem that simple rounding could be applied, and first experiments used this. However, it was found in subsequent tests that the choice of round-up or round-down resulted in a significant performance change for the chrominance coding. The rounding must be selected on a macroblock basis, and since there are two axes for the vectors, there are several rounding combinations as shown in FIG. 2.

Figure 2A:
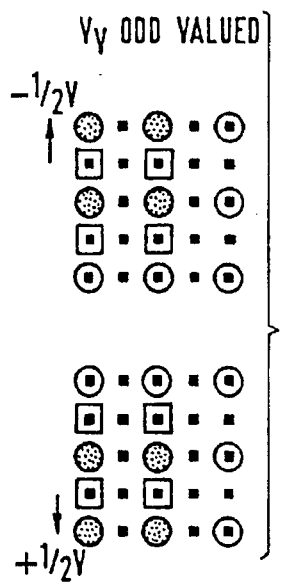
FIG. 2 shows a rounding process used for chrominance vector estimation.
Figure 2B:
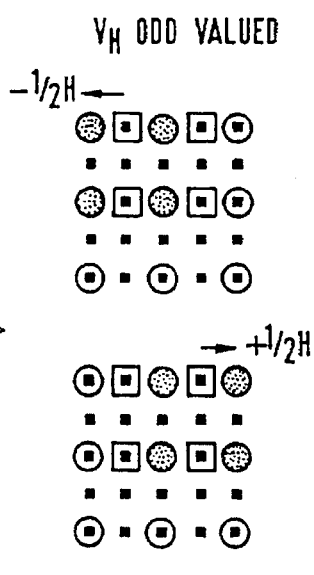
Figure 2C:
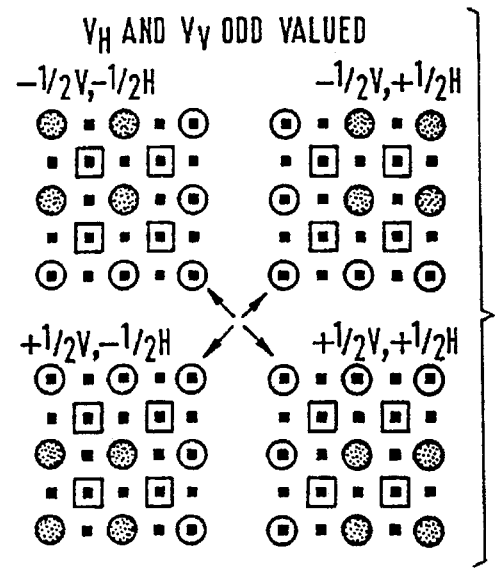

In the first case, as shown in FIG. 2, where the horizontal vector is even valued and the vertical vector is odd valued, then the horizontal chrominance vector is simply half the luminance vector. However, the odd valued vertical vector can be rounded either up or down as indicated in the figure. Likewise for the second case where the vertical vector is even valued and the horizontal vector is odd valued. In this case, the horizontal rounding can be either up or down as indicated. In the last case, both horizontal and vertical vectors are odd valued resulting in four possible rounding options as shown.

The method of dynamically rounding on a macroblock basis could be avoided if the chrominance data were interpolated to the same size as the luminance data; however, this is expensive and uses extra memory. This alternative method works well and can be simply implemented by adding one extra bit to each luminance vector. If the bit is zero, then the rounding oft he chrominance vector is 'down'; if the bit is one, then the rounding is 'up'. This small overhead will cover all the options shown in FIG. 2 and is a much lower overhead than that required to send independent chrominance vector data. Note that the technique is applied to both MVE and MVC processes.

A further issue concerns the relationship between the scaling of Y and C values to generate the mean square error MSE (or mean absolute difference MAD) values for MVE. Both Y and C are used since the vector will represent both components and where, for example, block matching of the luminance component may show little difference, the chrominance difference value may hold the balance of vector selection. In various experiments, the ratio did not seem to be critical and both the following expressions were used for vector selection at various points in the project timescale:

The first test results used 'VID' pictures compressed using the 2-frame 'SX' system using alternate 'I' and 'B' frames. These results show the effects of applying first horizontal interpolation, only, then horizontal and vertical interpolation where the vertical interpolation was applied to a frame (rather than a field).

TABLE 1

Sub-Pixel Motion Compensation Using Different Methods

| Frame Number: | | 1 | 3 | 5 | 7 | 9 | 11 | 13 | 15 | 17 | 19 |
|---|---|---|---|---|---|---|---|---|---|---|---|
| No | Y mse | 7.3841 | 6.9818 | 6.4252 | 7.7629 | 7.4938 | 7.0807 | 9.9862 | 8.0370 | 10.001 | 8.7079 |
| Interpolation | C mse | 2.7787 | 2.5288 | 2.7253 | 2.6123 | 2.3503 | 2.2419 | 2.0432 | 1.8610 | 1.8340 | 1.9962 |
| | Y S/N | 36.69 | 36.65 | 36.72 | 36.64 | 36.64 | 36.66 | 36.56 | 36.48 | 36.55 | 36.51 |
| | C S/N | 37.31 | 37.24 | 37.32 | 37.35 | 37.27 | 37.29 | 37.18 | 37.06 | 37.07 | 37.02 |
| | Y bpp | 1.4937 | 1.4935 | 1.4622 | 1.5349 | 1.5334 | 1.4951 | 1.6676 | 1.5773 | 1.6626 | 1.5910 |
| | C bpp | 0.4685 | 0.4565 | 0.4641 | 0.4581 | 0.4465 | 0.4469 | 0.4358 | 0.4273 | 0.4278 | 0.4281 |
| | Σ bpp | 1.9622 | 1.9500 | 1.9263 | 1.9930 | 1.9799 | 1.9420 | 2.1034 | 2.0046 | 2.0904 | 2.0191 |
| Horizontal | Y mse | 7.1965 | 6.6262 | 6.0303 | 7.525 | 7.2961 | 7.7389 | 6.3086 | 5.8330 | 5.4225 | 7.3818 |
| Interpolation | C mse | 1.9811 | 1.9371 | 1.8813 | 1.9883 | 1.9111 | 1.8585 | 2.0060 | 1.7843 | 1.9985 | 1.9191 |
| Only | Y S/N | 36.67 | 36.65 | 36.73 | 36.63 | 36.63 | 36.60 | 36.67 | 36.78 | 36.80 | 36.67 |
| | C S/N | 37.41 | 37.32 | 37.41 | 37.43 | 37.34 | 37.34 | 37.18 | 37.06 | 37.06 | 37.03 |
| | Y bpp | 1.4981 | 1.4905 | 1.4527 | 1.5448 | 1.5417 | 1.5707 | 1.4453 | 1.3969 | 1.3810 | 1.4948 |
| | C bpp | 0.4102 | 0.4108 | 0.4077 | 0.4089 | 0.4075 | 0.4107 | 0.4268 | 0.4127 | 0.4333 | 0.4244 |
| | Σ bpp | 1.9083 | 1.9013 | 1.8604 | 1.9537 | 1.9492 | 1.9814 | 1.8721 | 1.8186 | 1.8143 | 1.9192 |
| Horizontal | Y mse | 7.5413 | 7.2948 | 6.8039 | 8.0667 | 7.9487 | 8.2087 | 6.4070 | 6.0407 | 5.4421 | 7.7807 |
| and | C mse | 1.8764 | 1.9113 | 1.9978 | 1.9651 | 1.8879 | 1.8651 | 2.0660 | 1.8445 | 2.0226 | 1.8970 |
| Vertical | Y S/N | 36.68 | 36.65 | 36.73 | 36.64 | 36.64 | 36.61 | 36.67 | 36.78 | 36.80 | 36.69 |
| Interpolation | C S/N | 37.42 | 37.34 | 37.43 | 37.44 | 37.34 | 37.36 | 37.19 | 37.07 | 37.06 | 37.03 |
| | Y bpp | 1.5114 | 1.5133 | 1.4843 | 1.5674 | 1.5645 | 1.5930 | 1.4547 | 1.4070 | 1.3840 | 1.5059 |
| | C bpp | 0.4099 | 0.4089 | 0.4083 | 0.4094 | 0.4054 | 0.4087 | 0.4269 | 0.4213 | 0.4324 | 0.4230 |
| | Σ bpp | 1.9213 | 1.9222 | 1.8926 | 1.9768 | 1.9699 | 2.0017 | 1.8816 | 1.8283 | 1.8164 | 1.9289 |

$MSE(a) = (Y_e)^2 + (C_e)^2$ $MSE(b) = (Y_e)^2 + 2*(C_e)^2$

Since there seems to be little benefit for either, the first case is to be recommended because of its simplicity.

In the experiments conducted to assess the benefits of sub-pixel MVE and MVC, only ½ pixels have been considered. Using 'VID' files presents a problem in that the video is interlaced and the question arises as to the best method of vertical interpolation. Horizontal interpolation is not a problem.

Using 'SIF' and 'QIF' picture sources presents a simple linear interpolation process since both are effectively frame based progressively scanned at 25 frames per second. However, the filter order becomes an important issue as the pixel sizes reduce since the filter ringing artifacts become increasingly visible.

All interpolation filters have been based on half-band filters. Four types were used offering increasing tap lengths and sharper transition bands as follows:

| | | | | | 1 | 2 | 1 | | | | |
|---|---|---|---|---|---|---|---|---|---|---|---|
| 1) | | | | | | | | | | | |
| 2) | | | | -1 | 0 | 9 | 16 | 9 | 0 | -1 | |
| 3) | | | 3 | 0 | -16 | 0 | 77 | 128 | 77 | 0 | -16 | 0 | 3 |
| 4) | -6 | 0 | 26 | 0 | -79 | 0 | 315 | 512 | 315 | 0 | -79 | 0 | 26 | 0 | -6 |

These filters will be referred to as respectively 1, 2, 3 and 4.

The horizontal filter was set to type 3 and the vertical to type 1. The results are shown in Table 1 for a system with the following parameters:

Source Picture: Mobile & Calendar, frames 0–20

Compression type: I-B, 2-frame with 3-stage Wavelet Spatial Decimation

Quantisation: Q=1070, Quantiser viewing Height=3H

From this table, it can be clearly seen that the addition of horizontal sub-pixel motion compensation is worthwhile leading to significant drops in the overall bit rate (whilst S/N remains similar). However, the addition of vertical sub-pixel motion compensation adds nothing, indeed makes the performance worse. The benefits of vertical sub-pixel motion compensation are, therefore, difficult to justify for an interlaced scan picture source.

However, SIF and QIF pictures are frame based and do not have any problems with interlace. In experiments on both types of picture source, the application of sub-pixel motion compensation is equally valid in both the horizontal and vertical directions and as such the same filters are used for interpolation in both axes.

The second set of results were a rather more comprehensive comparison of pixel and sub-pixel motion compensation based on the use of SIF pictures coded at 0.4 bpp (~1 Mbps) based on an 8 frame GOP with Wavelet Spatial Decimation. Results are given in Table 2 below.

TABLE 2

Results of Pixel and Sub-pixel based Motion Vector Compensation for 1 Mbps SIF Pictures

| Vector Type: | | Integer Motion Vectors | | | | | | Sub-Pixel Motion Vectors | | | | |
|---|---|---|---|---|---|---|---|---|---|---|---|---|
| Sequence | | Q | Y S/N | C S/N | Y bpp | C bpp | Σ bpp | Q | Y S/N | C S/N | Y bpp | C bpp | Σ bpp |
| Mobile | 0–8 | 185 | 27.57 | 29.69 | .3363 | .1065 | .3895 | 220 | 28.94 | 30.76 | .3356 | .1241 | .3976 |
| & | 8–16 | 185 | 27.61 | 29.69 | .3328 | .1073 | .3864 | 215 | 28.74 | 30.64 | .3285 | .1234 | .3902 |
| Calendar | 16–24 | 205 | 28.54 | 30.28 | .3305 | .1195 | .3902 | 230 | 29.32 | 31.12 | .3327 | .1254 | .3954 |
| Renata | 0–8 | 280 | 31.60 | 35.83 | .3655 | .0659 | .3984 | 300 | 32.04 | 36.10 | .3645 | .0700 | .3995 |
| | 8–16 | 270 | 31.24 | 35.53 | .3568 | .0643 | .3889 | 280 | 31.53 | 35.63 | .3510 | .0660 | .3840 |
| | 16–24 | 290 | 31.44 | 35.69 | .3637 | .0631 | .3952 | 310 | 31.89 | 36.01 | .3672 | .0706 | .4025 |
| Football | 0–8 | 450 | 37.28 | 39.49 | .3596 | .0677 | .3934 | 490 | 37.91 | 39.90 | .3614 | .0745 | .3986 |
| | 8–16 | 415 | 36.52 | 38.72 | .3629 | .0576 | .3917 | 470 | 37.37 | 39.35 | .3615 | .0652 | .3927 |
| | 16–24 | 320 | 33.88 | 36.63 | .3633 | .0578 | .3922 | 360 | 34.63 | 37.23 | .3601 | .0674 | .3938 |
| Susie | 0–8 | 1170 | 43.46 | 45.50 | .3509 | .0846 | .3932 | 1420 | 44.75 | 46.21 | .3497 | .1006 | .4000 |
| | 8–16 | 1160 | 43.48 | 45.48 | .3550 | .0839 | .3969 | 1410 | 44.60 | 46.25 | .3459 | .1016 | .3967 |
| | 16–24 | 1095 | 42.98 | 45.31 | .3475 | .0744 | .3847 | 1300 | 44.37 | 46.04 | .3546 | 0911 | .4001 |
| | 24–32 | 980 | 42.59 | 44.96 | .3578 | .0668 | .3912 | 1140 | 43.60 | 45.46 | .3541 | .0760 | .3921 |
| | 32–40 | 800 | 42.10 | 44.34 | .3559 | .0698 | .3908 | 810 | 42.32 | 44.32 | .3587 | .0672 | .3923 |
| | 40–48 | 890 | 43.67 | 44.99 | .3434 | .1028 | .3948 | 900 | 43.74 | 45.07 | .3416 | .1026 | .3929 |

Note 1: the calculation of the sum bit rate is Y+C/2 since the chrominance only has half the number of pixels compared to luminance.

Note 2: the interpolation filter was of type 4 (the most complex) for both horizontal and vertical axes.

The results show a clear benefit of using sub-pixel vectors; rather clearer than the earlier example, and where the use of sub-pixel motion vectors produces a visible improvement in picture quality in viewing tests.

Tests of QIF coding always used sub-pixel motion vector compensation since all available methods were required to make any useful results available at the low bits-per-pixel targeted for this application. Hence no comparative measurements are available for QIF coding.

The investigations of the previous section revealed an anomaly in the philosophy of motion vector estimation as currently performed. It was not clear whether this would affect coding performance.

The anomaly only affects 'B' frames, not 'P' frames. Each 'B' frame has associated a pair of motion vectors, one pointing to the frame behind in time, the other pointing to a frame in advance. The selection of the vectors is made by comparing the macroblock of the current frame with a macroblock in another frame, but offset by an X-Y coordinate offset. This is usually calculated forwards and backwards by independent calculations. However, a 'B' frame is created by taking the average macroblock created from macroblocks in frames forwards and backwards of the 'B' frame; i.e.

$B_1 = I_1 - I_0/2 - I_2/2$. This is equivalent to a high pass filter: $-1, 2, -1$.

The optimum macroblocks from frames $I_0$ and $I_2$ are normally calculated independently. This is equivalent to using a filter of type: $1, -1$. The filters used for MVE are not the ones used for MVC. It is possible to envisage specific patterns which could cause a serious problem with the current method of MVE.

It is also easy to envisage a method of MVE which overcomes the problem by comparing the $I_1$ frame with all combinations of vector offsets each side. However, for a vector range of +/−V pixels, the independent vector calculation is proportional to:

$2*(V^2)$ whereas, with a bidirectional search, the calculation becomes proportional to:

$(V^2)^2 = V^4$, i.e. many times larger.

Where normal vector estimation is a severe computational problem, the prospect of bi-directional vector estimation for 'B' frame calculations is forbidding. No formal work has been done in this area. Indications given by the MSE values show that the normal method of MVE generation produces results which are close to the bi-directional value and it is suspected that for most pictures, there is no gain. However, designers should be aware of this problem should it ever become noticeable with certain motion sequences. If it becomes necessary to look into this area in more detail, it should be noted that there are ideas to minimise the processing impact—namely to use the independent results as a first estimate, then adopt a small search sub-area for each vector set to search for a minimum on the basis of a bi-directional search.

Note that the bi-directional search is only a function of encoding, and does not affect decoders; thus it is a retrofittable feature to an encoder.

Figure 3A:
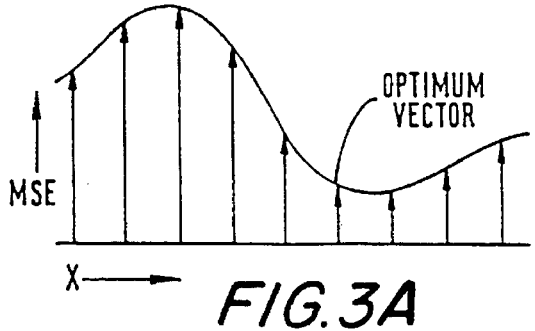
FIG. 3 shows the use of interpolation filters to create sub-pixel vectors.
Figure 3B:
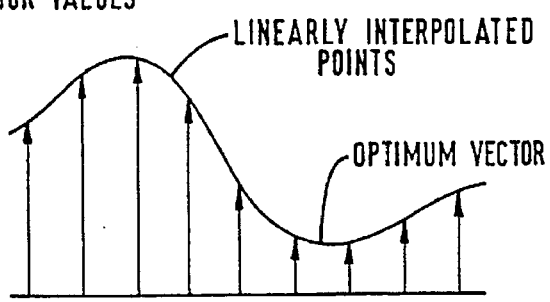

Almost all the results of integer motion vector estimation show a relatively slow variation of values around the minimum vector. This raises the prospect of using a filter to determine sub-pixel vectors by applying interpolation filters to the vector correlation profile rather than the signal. The concept is simply illustrated in FIG. 3.

The interpolating filters should be of the half-band type defined earlier as filters 1–4. It is necessary for the interpolating filter to have negative valued coefficients otherwise interpolated vector values will never be minimum. Early work in this area proved the potential of this technique, but other areas of work meant that this technique was never established over the standard method of interpolating the picture data to generate sub-pixel motion vectors. This technique still needs further work to confirm if it produces vectors which are as reliable as the conventional method. The benefit is the considerable reduction in computation time taken to produce sub-pixel vector results.

A significant aspect of motion vector compensation is that of applying a soft window to the macroblock structure. During tests on the 1 Mbps 'SIF' coded pictures, it was noticed that in areas of rapid movement, the macroblock structure becomes visible. This is clearly evident when stepping through the sequence frame by frame. The macroblock became much more visible at the low rate of 256 Kbps using 'QIF' pictures where the macroblocks occupy, an array size of 11 by 9 and are thus 16 times the area of a 'VID' coded picture.

At such a low bit rate, it became necessary to consider methods of improving the macroblock error visibility. As mentioned earlier, using smaller sized macroblocks is not possible because of the excessive bit rate taken by larger number of vectors. However, it is possible to significantly reduce the visibility of macroblock errors by using a windowing technique. The basic size of the macroblock remains 16*16 for luminance (8*8 for each chrominance); however, a window of 24*24 (12*12 for chrominance) is used for the vector assisted frame differencing. In order for the overall estimation picture to have equal gain, the edges of the window are tapered as shown in FIG. 4 which shows window functions for Y and C macroblocks.

Figure 4A:
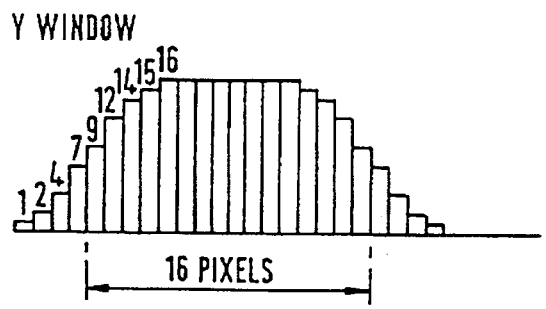
FIG. 4 shows window functions for luminance and chrominance macroblocks.
Figure 4B:
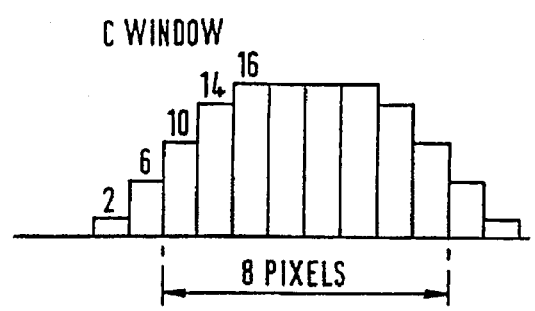
Figure 5A:
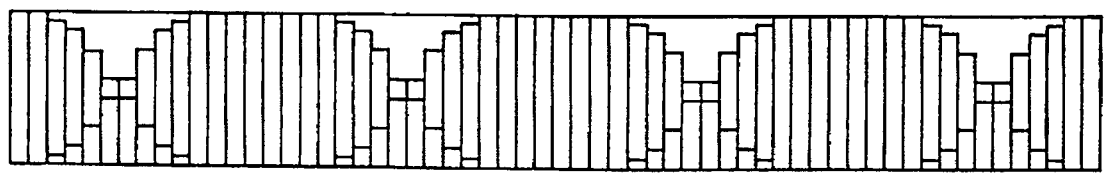
FIG. 5 shows overlay of the motion vector windows in one and two dimensions.
Figure 5B:
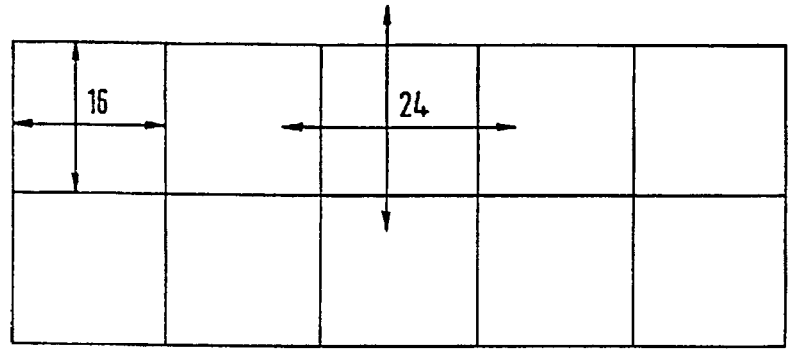

The windows shown in FIG. 4 form 'tiles' which can be overlaid on each other to form an overall flat surface as illustrated in FIG. 5.

Using the 1-D template given in FIG. 4 and representing the window by the expression:

```
for(x=0; x<24; x++)     window [x] = template[x];
```
then the 2-D window is given by the expression:
```
for(x=0; x<24; x++)
    for(y=0; y<24; y++)
        window[x][y]=template[x]*template[y];
```

Since the 1-D window is scaled by a value of 16, then the 2-D window is scaled by a factor of 256.

Tests were carried out to assess the effectiveness of windowed motion vectors used in both the motion estimation and motion compensation processes. These results are summarised in Tables 3 and 4 which show for different types of sequence, respectively:

(i) Using block based MVE and comparing block based MVC with window based MVC (ii) Using window based MVC and comparing block based MVE with window based MVE.

TABLE 3

Comparing Block MVC against Windowed MVC

| MV Type: | | Block MVE, block MVC | | | | | | Block MVE, window MVC | | | | |
|---|---|---|---|---|---|---|---|---|---|---|---|---|
| Sequence | | Q | Y S/N | C S/N | Y bpp | C bpp | Σ bpp | Q | Y S/N | C S/N | Y bpp | C bpp | Σ bpp |
| Mobile | 0–8 | 182 | 28.35 | 32.52 | .2646 | .1228 | .3260 | 184 | 28.42 | 32.56 | .2636 | .1242 | .3257 |
| & | 8–16 | 175 | 28.15 | 32.34 | .2683 | .1140 | .3253 | 177 | 28.23 | 32.40 | .2679 | .1150 | .3254 |
| Calendar | 16–24 | 182 | 28.48 | 32.72 | .2681 | .1185 | .3273 | 182 | 28.47 | 32.71 | .2656 | .1183 | .3247 |
| Renata | 0–8 | 294 | 32.88 | 39.61 | .3027 | .0447 | .3250 | 294 | 32.90 | 39.65 | .3020 | .0446 | .3243 |
| | 8–16 | 315 | 33.32 | 40.10 | .2984 | .0543 | .3255 | 315 | 33.23 | 40.11 | .2999 | .0543 | .3270 |
| | 16–24 | 345 | 34.00 | 40.44 | .2965 | .0561 | .3245 | 350 | 33.96 | 40.51 | .3006 | .0571 | .3291 |
| Football | 0–8 | 285 | 34.14 | 38.60 | .3052 | .0296 | .3200 | 305 | 34.69 | 38.90 | .3112 | .0319 | .3271 |
| | 8–16 | 285 | 33.39 | 38.55 | .3078 | .0251 | .3203 | 300 | 33.81 | 38.78 | .3126 | .0263 | .3257 |
| | 16–24 | 235 | 31.38 | 37.33 | .3124 | .0261 | .3254 | 242 | 31.68 | 37.45 | .3119 | .0271 | .3254 |
| Susie | 0–8 | 940 | 42.63 | 47.59 | .2952 | .0643 | .3273 | 920 | 42.35 | 47.36 | .2954 | .0617 | .3262 |
| | 8–16 | 930 | 42.72 | 47.54 | .2956 | .0622 | .3267 | 915 | 42.50 | 47.44 | .2961 | .0615 | .3268 |
| | 16–24 | 860 | 41.98 | 47.02 | .2987 | .0548 | .3261 | 860 | 41.83 | 47.02 | .2996 | .0548 | .3266 |
| | 24–32 | 730 | 40.68 | 46.39 | .3037 | .0478 | .3276 | 735 | 40.63 | 46.53 | .3024 | .0483 | .3265 |
| | 32–40 | 470 | 38.55 | 43.27 | .3130 | .0288 | .3274 | 494 | 39.02 | 43.68 | .3084 | .0306 | .3237 |
| | 40–48 | 470 | 39.44 | 42.36 | .3107 | .0251 | .3232 | 540 | 40.76 | 43.03 | .3109 | .0291 | .3254 |

TABLE 4

Comparing Block Matched MVE and Window Matched MVE

| MV Type: | | Block MVE, block MVC | | | | | | Block MVE, window MVC | | | | |
|---|---|---|---|---|---|---|---|---|---|---|---|---|
| Sequence | | Q | Y S/N | C S/N | Y bpp | C bpp | Σ bpp | Q | Y S/N | C S/N | Y bpp | C bpp | Σ bpp |
| Mobile | 0–8 | 184 | 28.42 | 32.56 | .2636 | .1242 | .3257 | 184 | 28.41 | 32.56 | .2646 | .1244 | .3268 |
| & | 8–16 | 177 | 28.23 | 32.40 | .2679 | .1150 | .3254 | 176 | 28.17 | 32.36 | .2667 | .1146 | .3240 |
| Calendar | 16–24 | 182 | 28.47 | 32.71 | .2656 | .1183 | .3247 | 182 | 28.48 | 32.71 | .2655 | .1184 | .3247 |
| Renata | 0–8 | 294 | 32.90 | 39.65 | .3020 | .0446 | .3243 | 301 | 33.02 | 39.89 | .3041 | 0.461 | .3271 |
| | 8–16 | 315 | 33.23 | 40.11 | .2999 | .0543 | .3270 | 315 | 33.27 | 40.12 | .2962 | .0544 | .3234 |
| | 16–24 | 350 | 33.96 | 40.51 | .3006 | .0571 | .3291 | 350 | 34.00 | 40.50 | .2988 | .0571 | .3273 |
| Football | 0–8 | 305 | 34.69 | 38.90 | .3112 | .0319 | .3271 | 308 | 34.74 | 39.19 | .3108 | .0324 | .3270 |
| | 8–16 | 300 | 33.81 | 38.78 | .3126 | .0263 | .3257 | 300 | 33.86 | 38.91 | .3106 | .0262 | .3237 |
| | 16–24 | 242 | 31.68 | 37.45 | .3119 | .0271 | .3254 | 242 | 31.64 | 37.49 | .3101 | .0271 | .3236 |
| Susie | 0–8 | 920 | 42.35 | 47.36 | .2954 | .0617 | .3262 | 920 | 42.36 | 47.35 | .2980 | .0617 | .3296 |
| | 8–16 | 915 | 42.50 | 47.44 | .2961 | .0615 | .3268 | 930 | 42.57 | 47.53 | .2987 | .0622 | .3298 |
| | 16–24 | 860 | 41.83 | 47.02 | .2996 | .0548 | .3266 | 860 | 41.83 | 47.01 | .2977 | .0548 | .3251 |
| | 24–32 | 735 | 40.63 | 46.53 | .3024 | .0483 | .3265 | 738 | 40.65 | 46.53 | .3009 | .0485 | .3251 |
| | 32–40 | 494 | 39.02 | 43.68 | .3084 | .0306 | .3237 | 494 | 39.04 | 43.69 | .3087 | .0306 | .3240 |
| | 40–48 | 540 | 40.76 | 43.03 | .3109 | .0291 | .3254 | 540 | 40.78 | 43.25 | .3081 | .0293 | .3227 |

The cost of implementing windowed MVC is relatively small and is a practical option, particularly in view of the considerable quality improvement obtained over block based MVC. This improvement is numerically most noticeable in the last two rows of the Susie results in Table 3. Other rows show little change or even slightly worse results. The visual effect of windowed MVC is, however, always better than block based MVC.

Turning to the results of Table 4; the results of the comparison show small differences in some sequences, but the implementation of windowed MVE is very expensive since it involves computations over a much wider area. This is reflected in the software run-time which was noticeably slower than block based MVE. This factor, together with the results of Table 5 clearly show that the effort of using both windowed MVE and windowed MVC is not worthwhile. There is also little visual improvement also. However, using block based MVE and window based MVC is very beneficial and change a previously unacceptable picture quality (the Susie sequence in particular) to a much more acceptable quality level.

The combination of block-based MVE and window based MVC was also applied to the SIF coded pictures at 1 Mbps with a similar quality improvement. It has yet to be established that the improvement is worthwhile at higher data rates (e.g. for 'VID' pictures at 4 Mbps), however, it is likely that the benefit will still exist, but at lower levels.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A video compression method involving motion vector processing, wherein the chrominance sampling rate is half the luminance sampling rate, the method comprising estimating a luminance motion vector representing luminance motion in a video picture, making a rounding decision, if necessary, as to the best corresponding chrominance motion fit, and including an additional bit in said luminance motion vector, the digital value of said additional bit representing the rounding decision, wherein said luminance motion vector with additional bit conveys information as to both luminance and chrominance motion.

2. A method according to claim 1, wherein a chrominance motion vector is derived by division of said luminance motion vector by two, and if a rounding decision is necessary following the division, that decision is made in response to the digital value of said additional bit of the luminance motion vector.

3. A method according to claim 1, wherein the rounding decision is made on the basis of a mean square error of motion vector estimation involving the sum of the squares of luminance and chrominance errors.

4. A method according to claim 1, wherein the luminance motion vector includes one additional bit whose digital value represents a rounding in the horizontal direction.

5. A method according to claim 1, wherein the luminance motion vector includes one additional bit whose digital value represents a rounding in the vertical direction.

6. A method according to claim 1, wherein the luminance motion vector includes first and second additional bits whose respective digital values represent rounding in both horizontal and vertical directions.

* * * * *